April 25, 1961   B. C. BARTON ET AL   2,981,304
PNEUMATIC TIRE
Filed March 31, 1955
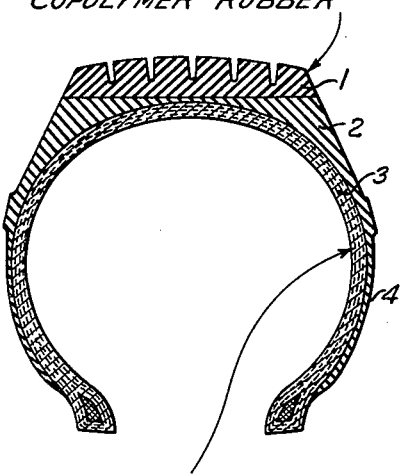
TREAD COMPRISING
META-VINYLPYRIDINE : BUTADIENE
COPOLYMER RUBBER
CARCASS COMPRISING
HEVEA RUBBER, GR-S,
OR BUTYL RUBBER
INVENTORS
BERNARD C. BARTON
HENRY E. HAXO, Jr.
BY James J. Long
AGENT United States Patent Office 2,981,304
Patented Apr. 25, 1961

2,981,304
PNEUMATIC TIRE

Bernard C. Barton, Clifton, and Henry E. Haxo, Jr., Bloomfield, N.J., assignors to United States Rubber Company, New York, N.Y., a corporation of New Jersey Filed Mar. 31, 1955, Ser. No. 498,427

25 Claims. (Cl. 152—330)

This invention relates to improved pneumatic tires. More particularly, it relates to such tires having treads characterized by very greatly improved resistance to abrasive wear.

During the period following the adoption of high quality carbon black in tire tread compounds (around 1920), some 25 years passed with no revolutionary improvement in the abrasion resistance of rubber tread compounds commercially used in tires. The increased tire mileage which occurred during this period was largely due to improved tire design and construction.

During the past 10 years, two great advances in tire manufacture were made. The first of these advances was the use of GR–S tire treads culminating in the commercial exploitation of "cold" GR–S. The commercial use of "cold" GR–S tread compounds increased the mileage of tires on the average by about 15%. The second advance in tire manufacture occurred simultaneously with the adoption of "cold" GR–S. This was the introduction of furnace blacks in tread compositions. It resulted in further improvement in the overall quality of tire treads. Together these two innovations have enabled the tire manufacturer to increase the mileage of present day tires by about 20–30% over that of tires made 10 or more years ago.

Going along with these great advancements in tire quality an enormous amount of research and development effort has been expended toward developing new synthetic rubbers suitable for use in the construction of tires. Thousands of new rubber-like polymers and copolymers have been prepared and evaluated by the rubber industry and the United States Government for this purpose. The great majority of these materials reported in the literature were found to be lacking in one or more of the unique physical properties essential for rubber to be used in tire construction.

Vinyl pyridine rubbers, by which we mean rubbery copolymers of vinyl pyridines with butadienes, are an example of one class of rubbery materials prepared, evaluated, and rejected by the tire industry. Thus, in a private communication of May 6, 1946, to the Office of Rubber Reserve, Goodyear Tire & Rubber Company scientists described the evaluation of copolymers of butadiene with the following vinylpyridines: 2-vinylpyridine; 4-vinylpyridine; 2-vinyl-5-ethylpyridine; 2-methyl-5-vinylpyridine; 2-vinyl-4-methylpyridine; 2-vinyl-6-methylpyridine; 2-vinyl-4,6-dimethylpyridine; and 2-vinylquinoline. In this communication they reported, "none of the various monomers listed showed any superiority over 2-vinylpyridine on the basis of tests on tread stock vulcanizates," and they did not recommend the use of vinylpyridine rubber in tires. They stated that vinylpyridine rubbers were "characterized by a lack of compatability with GR–S, natural rubber and even isoprene/vinylpyridine rubber" and that vinylpyridine rubber could not be used in tires unless it was used throughout. They concluded that a vinylpyridine rubber tread cannot be applied to a carcass of GR–S and Hevea.

In a publication appearing in volume 40, page 1437 (1948) of Industrial and Engineering Chemistry, W. W. Rinne and J. E. Rose stated that the use of vinylpyridine terpolymer rubbers in tires "has not been recommended, chiefly because of their lack of compatability with GR–S and natural rubber."

In a paper entitled, "Substituted Vinylpyridines as Monomers for Synthetic Elastomers," published in Industrial and Engineering Chemistry, vol. 40, page 879 (1948), Frank et al. describe the routine laboratory evaluation of copolymers of butadiene and the following vinylpyridine monomers: 2-vinylpyridine; 3-vinylpyridine; 4-vinylpyridine; 2-vinyl-5-ethylpyridine; 2-methyl-5-vinylpyridine; 2-methyl-6-vinylpyridine; and 2,4-dimethyl-6-vinylpyridine. In their evaluation particular attention was directed to stress-strain, hysteresis, and crack-growth properties. They showed that the vinylpyridine elastomer vulcanizates "exhibited stress-strain characteristics comparable to standard GR–S" and they showed no differences among the copolymers made from different vinylpyridine monomers.

The data reported by Frank et al. do not suggest any advantage of one copolymer over another nor that any would have an advantage over GR–S as a tire tread compound.

In an authoritative discussion of synthetic rubbers in the book "Synthetic Rubbers," edited by Whitby et al. and published by John Wiley and Sons in 1954, results are cited which show that there are no appreciable differences between copolymers prepared from the many vinylpyridine monomers. In this book, a tire test is described which indicates no advantage in resistance to tread wear for 2-vinylpyridine rubber over present "cold" GR–S, although it is shown by this test to be somewhat better than "hot" GR–S. The tires in this test contained 2-vinylpyridine rubber throughout and failed after very little service.

Although the references discussed above show that vinylpyridine copolymer rubbers have certain superior properties compared with GR–S, they also show that vinyl-piperidine rubbers were considered to have undesirable properties which rendered them unsuitable for tire treads. It is the bad qualities of a rubber which determine whether or not it can be used in the manufacture of the treads. As shown in the above indicated reports, it was the bad properties of the vinylpyridine rubbers that precluded their use as tire treads.

To all intents and purposes it appears, then, that the rubber industry has unqualifiedly rejected vinylpyridine rubbers as materials for the construction of tires.

Furthermore, since all of the published literature indicates that there are no appreciable differences between the various types of vinylpyridine rubbers, the different resistance to tread wear found in the only reported tire test would, on the basis of published information, be expected for all varieties of vinylpyridine rubbers.

We have now unexpectedly discovered a tire construction which has outstandingly better wear characteristics than the best tire made during the past ten years. The typical tires of our invention are capable on the average of wearing more than 50% longer than the best commercial tires made from "cold" GR–S and furnace blacks, and under certain operating conditions, more than 100% longer. In terms of miles, this means that a car owner who now gets 30,000 miles of wear from his tires will be able to get at least 45,000 miles from the tires made according to our invention. Mileages as much as 200% greater than those obtained from pre-war Hevea rubber tires are now obtained under certain conditions by our invention. This great advance in tire tread compounds has been made by using, in a novel combination, certain vinylpyridine rubbers which heretofore have been repeatedly reported to be unsatisfactory for use in tires.

A typical tire of the invention is shown in the accompanying drawing, the single figure of which is an essentially diagrammatic cross-sectional view of the tire.

In the drawing 1 is a tread of a meta-vinylpyridine copolymer rubber; 2 is an under-tread comprising Hevea rubber, GR-S, or Butyl rubber; 3 is the carcass comprising Hevea rubber, GR-S, or Butyl rubber; and 4 is the sidewall.

The tires of our invention are characterized by a tread composed of a copolymer of butadiene and either 3-vinylpyridine or 2-methyl-5-vinylpyridine, and a reinforcing filler, such as carbon black, in combination with a carcass comprising Hevea rubber which is essentially cis-polyisoprene or GR-S rubber (or mixtures thereof) or Butyl rubber. In other words, we have discovered that a tire made with a Hevea, GR-S or Butyl rubber carcass and a tread comprising vinylpyridine rubber in which the vinyl group on the pyridine is in the meta position (i.e., in the 3- or 5-position), is outstandingly better in resistance to abrasive wear than the best conventional tire made today having a GR-S tread. In direct contrast to this, tires otherwise similarly constructed but using in the tread vinylpyridine rubbers containing pyridines in which the vinyl group is not in the meta position show wear and abrasion properties scarcely better than those of GR-S treads. Thus, for example, tires having a GR-S or Hevea carcass and a tread made from a copolymer of butadiene with 2-vinylpyridine or 2-vinyl-5-ethylpyridine or 4-vinylpyridine have abrasion wear ratings little better than those of tires constructed with tread stocks of cold GR-S.

The outstanding wearing qualities of the tires of our invention are even more surprising in view of the equivalency we have found to exist in the physical properties of gum stocks (i.e., stocks devoid of filler) of all the vinylpyridine rubbers that we have tested. In every case these properties have been found to be substantially equivalent to those of "cold" GR-S. One would hardly expect any of these gum stocks to behave differently upon introduction of a reinforcing filler, yet when these gum rubbers are compounded with reinforcing fillers and built into a tire, the tires with treads containing vinylpyridine rubber in which the vinyl group is in the meta position on the pyridine molecule are vastly superior in wearing qualities to any of the other tires wherein the tread stocks contain other vinylpyridine rubbers or GR-S.

Although we do not wish to have our invention limited to any theory, it appears that a favorable interaction between the carbon black and the rubber takes place in those vinylpyridine rubbers having the vinyl group in the meta position. This favorable interaction between the filler and the rubber enables the successful utilization of the rubber in the construction of a tire having extraordinarily high wearing qualities.

In one embodiment of the invention the carcasses of the tires are made of GR-S rubber or Hevea rubber, the latter being especially preferred, although mixtures of GR-S rubber and Hevea rubber in any desired proportions are also suitable. GR-S, as is well known, is a standard commercial type of synthetic rubber, and is a copolymer of butadiene and styrene, containing from about 20 to 40% of styrene. The carcass of the tire of the invention is typically comprised of a plurality of plies of conventional tire cord fabric rubberized with such stocks in the conventional manner. The side areas of the carcass have applied thereto a conventional sidewall stock, also suitably based on GR-S rubber and/or Hevea rubber, and it is compounded so as to be flexible and resistant to cracking in a manner well understood by those skilled in the art of making tires.

In another embodiment of the invention, the carcass of the tire is based on Butyl rubber. Butyl rubber is a well known type of synthetic rubber made by low temperature copolymerization of an isoolefin with a minor proportion of a multi-olefinic unsaturate having from 4 to 14 carbon atoms per molecule. The isoolefins employed generally have from 4 to 7 carbon atoms, and such isomonoolefins as isobutylene or ethyl methyl ethylene are preferred. The multi-olefinic unsaturate usually is an aliphatic conjugated diolefin having from 4 to 6 carbon atoms, and is preferably isoprene or butadiene. The Butyl rubber contains only relatively small amounts of copolymerized diene, typically from about 0.5 to 5%, and seldom more than 10%, on the total weight of the elastomer. Conventional vulcanizable Butyl rubber carcass stocks may be applied to suitably prepared tire fabric, and the carcass may be assembled from a plurality of plies of such rubberized fabric in the usual manner. The side portions of the carcass will have applied thereto a suitable Butyl rubber sidewall stock. The Butyl rubber carcass is useful particularly in tires that are intended to be used for low-speed service, as for example in the case of farm tires; it is in such service that the full advantage may be taken of the outstanding resistance of the Butyl rubber carcass and sidewalls to deterioration upon aging.

According to our invention a pneumatic tire having a tread of meta-vinylpyridine/butadiene copolymer rubber may typically be constructed in the following manner. A carcass of laminated textile cords adhered together by means of compositions of Hevea and/or GR-S, or Butyl rubber, and suitable vulcanizing ingredients commonly used in tire building, is built up on a tire building drum in the usual manner. Likewise, a tread composition is mixed comprising 2-methyl-5-vinylpyridine/butadiene rubbery copolymer and vulcanizing ingredients including sulfur and accelerator. The accelerator selected for the tread composition is preferably of the well known delayed action type which will prevent scorching during the mixing operation and which will provide a short delay during the vulcanization step before the rubber commences to cure.

The manner of combining the tread and carcass depends on whether or not a "cushion" or other under-tread structure is used. When the tire structure is to include an under-tread portion, as shown in the drawing, an under-tread compound is mixed, consisting typically for example of approximately equal parts of Hevea and GR-S blended together, and compounded with the usual vulcanizing ingredients including sulfur and accelerator. It is preferred to use a delayed action accelerator as more fully explained below. The under-tread and tread compositions are then given a suitable shape for application in the tire building, as by calendering or extrusion. The tread portion may be given a tread-like profile having a raised crown portion and shoulders tapering down to thinner side portions. The profiled material may also include the sidewalls. A composite strip comprising the tread and under-tread portions may be formed and extruded through a common die head, as by the dual extrusion process shown in Lehman, U.S. Patent 2,096,362. Dual extrusion processes wherein strips of tread stock and under-tread stock converge and unite at a common die are also shown in Kilborn, U.S. Patent No. 2,444,831, in Fay, U.S. Patent No. 2,569,373, in Snyder et al., U.S. Patent No. 1,952,469, and in Seaman and Merrill, "Machinery and Equipment for Rubber and Plastics" (India Rubber World, publishers, 1952), volume 1, pp. 571-2. The thus integrally united tread and under-tread bands are then applied to the built-up carcass on the tire-building drum.

Another method of insuring the adhesion of the meta-vinylpyridine rubber tread to the inner parts of the tire, whether or not an under-tread is used, is to employ rubber cements applied to the meeting surfaces of the parts to be united. The cements preferably contain blends of rubbers like those in both of the parts which are to be united. The cement may be applied by brushing, spraying, etc. The intermediate adhesive layer may also be applied in the form of a preformed strip, suitably compounded with carbon black and vulcanizing and other compounding ingredients if desired. A delayed action accelerator of the same type as used in vulcanizing the tire tread is preferably used with the other vulcanizing ingredients in the intermediate layer or in the cement composition.

To complete the building of the tire, sidewalls and beads are applied, and the assembly is then transferred to a tire mold and vulcanized.

Tires constructed according to our invention have been subjected to severe road-testing conditions and have exhibited a resistance to abrasion which is far superior to that of tires made with a standard GR-S tread. Thus, we have succeeded in building a tire with a tread of meta-vinylpyridine rubber whereas this has not heretofore been achieved by others.

In the preparation of the meta-vinylpyridine copolymer rubber which we employ in our invention, the butadiene-1,3 may be replaced in whole or in part by 2-methyl-butadiene-1,3 (isoprene), with similar results in the tires. The meta-vinylpyridine with which the diene is copolymerized, viz., either 2-methyl-5-vinylpyridine or 3-vinylpyridine, may be replaced in part with styrene. It is understood that by styrene we mean styrene or any of its well-known equivalents, such as alpha-methyl styrene, chlorostyrene, etc. The diene component always comprises from 70 to 85 parts per 100 parts, by weight, of the interpolymer. The mono-vinyl material correspondingly comprises from 30 to 15 parts of the rubber, of which amount the meta-vinylpyridine may comprise as little as 5 parts, but preferably comprises at least 10 parts.

Rubber is often extended by inclusion of considerable amounts of oil and we intend to include such oil-extended rubbers within the scope of our invention. The common practice in compounding oil extended rubbers is to regard the oil content as though it were rubber.

The compounding of the meta-vinylpyridine rubber used in our invention is carried out in such manner as to produce vulcanizates which have stress-strain characteristics similar to those of standard GR-S vulcanizates having reinforcing amounts of carbon black. The meta-vinylpyridine rubber is characterized by a higher rate of cure than standard GR-S, and therefore the amounts of sulfur and accelerator are often reduced accordingly. The accelerators recommended are preferably those which start the curing after a short delay. Such accelerators that are effective in the presence of carbon black are well-known, typical examples being the proprietary materials known as "Santocure" (2-benzothiazole-N-cyclo-hexylsulfenamide), and "FLD" or "Novex" (benzal-bis-[dimethyldithiocarbamate]). Exceptionally good results have been secured by the use of the last-named accelerator.

Carbon blacks which are ordinarily used in tread stocks are employed in the tires of our invention. For example, MPC blacks, EPC blacks, HAF blacks, and SAF blacks may be used. In general, we prefer to use EPC or MPC blacks in the tread stocks of the tires of our invention.

Our invention is equally applicable to the production of new tires, and to the recapping of used tires having Hevea or GR-S carcasses or Butyl rubber carcasses by the usual techniques.

The invention is not only applicable to the conventional type of tire intended to be used with a removable inner tube, but it is also applicable to the so-called tubeless tire having built into the carcass an integral means for retaining the air within the tire.

Examples illustrating our invention follow. In the examples, all parts are expressed by weight.

EXAMPLE 1

A tread compound "a" was prepared according to the following recipe:

| | Parts |
|---|---|
| Rubbery copolymer of 2-methyl-5-vinylpyridine and butadiene (25:75) made at 5° C. | 100 |
| MPC carbon black | 50 |
| Zinc oxide | 3 |
| Softener | 3 |
| Stearic acid | 3 |
| Novex | 0.8 |
| Sulfur | 2.25 |

As a control, an analogous tread compound "b" was prepared, differing from "a" in that the rubber employed was standard "cold" GR-S, the carbon black was a high-abrasion furnace black, and the organic vulcanization accelerator was a combination of mercaptobenzothiazole (0.6) and diphenylguanidine (0.3) in place of the "Novex" of compound "a."

The two tread stocks were calendered, cut and plied up in lengths suitable for tire re-capping.

An under-tread stock was mixed, consisting of Hevea smoked sheets (100), zinc oxide (3), furnace black (30), and softeners (3.5), stearic acid (0.5), Novex (1.5), antioxidant (0.5) and sulfur (2).

A cement was made by mill-mixing a stock consisting of a blend of the 2-methyl-5-vinylpyridine/butadiene rubbery copolymer used in "a" and Hevea smoke sheets (70:30), channel black (35), zinc oxide (3), softener (10), stearic acid (2), "Novex" (0.3) and sulfur (2), and then dissolving or dispersing the compound in a vehicle consisting of benzene and toluene (4:1 by volume) to produce a cement of about 15% solids (by weight).

The cement was then used for adhering strips of the respective tread stocks to strips of the under-tread stock, and a commercial recapping cement was used for adhering the resulting built-up bands to the buffed surfaces of tire carcasses from which the treads had been removed. The composition of the commercial recapping cement was similar to the under-tread stock with solvents added. The rubber of the carcasses and sidewall coverings thereof comprised conventionally compounded Hevea and GR-S rubbers. The assembled tires were then cured in tire molds (60 minutes at 145° C.).

The thus re-capped tires (of size 6.70 x 15) were then mounted on four automobiles and were subjected to road wear tests, each tire being shifted periodically from wheel to wheel in a regular pattern, in order to equalize differences in the rate of wear at different wheel positions.

Two of the automobiles in this test were driven in California and two in Texas. The following table shows the results obtained from the tire tests in these areas along with the mileage each car was driven.

Table I

| | | Percent Worn | | Relative Ratings | |
|---|---|---|---|---|---|
| Location | Mileage | Control (Cold GR-S) | Invention (Meta-vinyl-pyridine) | Control (Cold GR-S) | Invention (Meta-vinyl-pyridine) |
| Texas | 16,643 | 60.2 | 42.0 | 100 | 143 |
| Do | 18,294 | 42.4 | 28.5 | 100 | 149 |
| Los Angeles | 7,914 | 25.0 | 11.6 | 100 | 215 |
| Do | 10,035 | 50.0 | 31.0 | 100 | 161 |

It will be observed from Table I that the relative wear ratings of the tires of our invention range as high as 215, or over 100% better than tires with treads made from cold GR-S. The significance of this difference can be illustrated by comparing the estimated anti-skid life of these tires. For example, the results from the tires driven in Texas for 18,294 miles indicate the anti-skid life of the tires of our invention will be 64,200 miles. The estimated anti-skid life of the tires driven 7,914 miles in California is 31,600 for the controls and 68,200 for the tires of our invention.

EXAMPLE 2

In another series of tire tests, carried out in the same manner as in Example 1, comparison was made between tires having treads of (a) standard "cold" GR-S, (b) a butadiene:2-vinylpyridine copolymer rubber (75:25), and (c) a butadiene:2-methyl-5-vinylpyridine copolymer rubber (75:25, as in Example 1). Tire "a" was representative of a high grade commercial tire; tire "b" was made from a vinylpyridine rubber other than a meta-vinylpyridine rubber, and tire "c" was representative of our invention. The relative wear-resistance ratings were 100, 118, and 178, respectively. The remarkably great superiority of our tire is quite evident.

As was indicated earlier, only those tires having meta-vinylpyridine rubber treads in combination with the Hevea or GR-S carcass or the Butyl rubber carcass are included within the scope of our invention. Tires having treads of other rubbers, such as, for example, cold GR-S and ortho- or para-vinylpyridine rubbers, do not have wearing qualities of the same order as those of the present invention. This is illustrated by the following example.

EXAMPLE 3

A series of vinylpyridine/butadiene copolymer rubbers were prepared using a 25:75 feed ratio. All copolymers were made at 41° F. with the same polymerization recipe and to the same Mooney viscosity, etc. These rubbers were then compounded and used in building tires similar to those of Example 1. All vulcanizates were formulated in the same manner and vulcanized to the same stress at 300% elongation. In the following table we list the vinylpyridine used in the rubber employed for the tread of the tires, and the laboratory abrasion and tire road test ratings of these tires:

*Table II*

|  | Laboratory Abrasion Rating | Tire Road Test Rating |
|---|---|---|
| "Cold" GR-S-HAF black tread stock | 100 | 100 |
| Copolymers of: |  |  |
| 2-vinylpyridine | 115 | 116 |
| 2-vinyl 5-ethylpyridine | 114 | 120 |
| 2-vinyl-6-methylpyridine | 115 |  |
| 2-vinyl-4,6-dimethylpyridine | ¹ 115 |  |
| 4-vinylpyridine | 120 |  |
| 3-vinylpyridine | 178 |  |
| 2-methyl-5-vinylpyridine | 166 | 167 |

¹ Estimated.

The results in Table II show clearly the unique wearing qualities of the tires of our invention. The tires with treads containing copolymers of butadiene and 3-vinylpyridine and of butadiene and 2-methyl-5-vinylpyridine have wear ratings in excess of 50% greater than tires made from cold GR-S and other vinylpyridine-butadiene copolymers.

Further evidence of the unique character of the tires of our invention is that they have been run for 1,000 miles at 95 miles per hour without failure, whereas the commercial, premium grade tire having a cold GR-S tread failed in less than 100 miles under the same conditions.

EXAMPLE 4

As has been indicated, the tires of our invention may be composed of meta-vinylpyridine terpolymer rubbers as well as meta-vinylpyridine binary copolymer rubbers. The following tire test will illustrate the use of the terpolymer rubbers in the tires of our invention.

Four tires were made in a manner similar to those in Example 1 except that a terpolymer rubber composed of butadiene, 2-methyl-5-vinylpyridine and styrene, and polymerized with a feed ratio of 75:12.5:12.5 (parts by weight), was used as the tread rubber. This rubber was compounded similarly to the meta-vinylpyridine binary copolymer tread rubbers used in Example 1.

The tires were road-tested in Texas being driven 14,600 miles. At the end of this mileage the treads were 22.5% worn. Compared to standard commercial cold GR-S tires with a rating of 100, these tires had a rating of 160. Their estimated anti-skid life was 65,000 miles.

Tires may be constructed with a Butyl rubber carcass in a manner similar to those in Example 1, except that the cements employed in adhering the built up band of tread and under-tread to the carcass will be different and specifically designed for this purpose; for example, a cement prepared by adding solvents to reclaimed Butyl stock can be used in this embodiment of our invention. Other useful adhesives are disclosed in U.S. Patent 2,631,-948 to Crawford.

Although the compounding practices by which Butyl rubber, as well as Hevea rubber and GR-S rubber, are formulated into compositions for use as tire carcasses or sidewalls are well known and do not per se constitute a novel part of the invention, the following non-limiting examples may be cited as illustrative of a specific practice:

|  | Sidewall | Carcass |
|---|---|---|
| Natural rubber | 40 | 50 |
| GR-S | 60 | 50 |
| Reclaim | 45 | 60 |
| Furnace black | 42 | 35 |
| Stearic acid | 1.75 | 1.50 |
| Zinc oxide | 3.75 | 4 |
| Softener | 6 | 8 |
| Antitoxidant | 0.6 | 0.75 |
| Accelerator | 1.0 | 1.00 |
| Sulfur | 2.75 | 4 |

Examples of Butyl rubber carcass stocks, and other pertinent information on compounding Butyl rubber, are given in an article entitled "Butyl Rubber Properties and Compounding," by Haworth and Baldwin, Industrial and Engineering Chemistry, vol. 34 (1942), page 1301.

From the foregoing it will be apparent that the invention provides a novel and improved tire, based on a uinque combination of a critically selected meta-vinylpyridine copolymer rubber tread firmly adhered to a carcass that is not only economical but is admirably adapted to perform its function efficiently throughout greatly prolonged periods of service.

Having thus described our invention, what we claim and desire to protect by Letters Patent is:

1. A method of making a pneumatic tire capable of delivering high road mileage at high speeds and characterized by exceptionally high resistance to abrasive tread wear and by freedom from tread separation, comprising providing a fabric carcass rubberized with a copolymer of butadiene and styrene containing 20 to 40% of styrene, integrally uniting by simultaneous dual extrusion an under-tread portion comprising a rubber selected from the group consisting of Hevea rubber, butadiene:styrene copolymer rubber, mixtures of Hevea rubber and said butadiene:styrene copolymer rubber, and rubbery copolymer of an isoolefin having from 4 to 7 carbon atoms with 0.5 to 10% of a multi-olefinic unsaturate having from 4 to 14 carbon atoms and a tread comprising carbon black and a rubbery interpolymer of 15–30 parts of a meta-vinylpyridine and correspondingly 85–70 parts of butadiene, thereafter applying the thus integrally united tread and under-tread to the carcass, and vulcanizing the assembly in tire shape.

2. A pneumatic tire capable of delivering high road mileage and characterized by exceptionally high resistance to abrasive tread wear and by freedom from tread separation, comprising a fabric carcass rubberized with a carcass stock comprising a rubber selected from the group consisting of Hevea rubber, butadiene:styrene copolymer rubber containing 20 to 40% of styrene, mixtures of Hevea rubber and said butadiene:styrene copolymer rubber, and rubbery copolymer of an isoolefin having from 4 to 7 carbon atoms with 0.5 to 10% of a multi-olefinic unsaturate having from 4 to 14 carbon atoms, and a tread comprising carbon black and a rubbery interpolymer of 15 to 30 parts of a meta-vinylpyridine and correspondingly 85 to 70 parts of butadiene, and an under-tread portion comprising a rubber selected from the group consisting of Hevea rubber, butadiene:styrene copolymer rubber, mixtures of Hevea rubber and said butadiene:styrene copolymer rubber, and rubbery copolymer of an isoolefin having from 4 to 7 carbon atoms with 0.5 to 10% of a multi-olefinic unsaturate having from 4 to 14 carbon atoms disposed between said tread and carcass and integrally united therewith, the said tread being so compounded as to have stress-strain characteristics similar to those of a butadiene:styrene copolymer rubber tread.

3. A tire as in claim 2 in which the meta-vinylpyridine is 2-methyl-5-vinylpyridine.

4. A tire as in claim 2 in which the meta-vinylpyridine is 3-vinylpyridine.

5. A tire as in claim 3 in which the rubber of the carcass is Hevea rubber.

6. A tire as in claim 4 in which the rubber of the carcass is Hevea rubber.

7. A tire as in claim 3 in which the rubber of the carcass is a rubbery copolymer of isobutylene with 0.5 to 5% of isoprene.

8. A tire as in claim 4 in which the rubber of the carcass is a rubbery copolymer of isobutylene with 0.5 to 5% of isoprene.

9. A pneumatic tire capable of delivering high road mileage and characterized by exceptionally high resistance to abrasive tread wear and by freedom from tread separation, comprising a fabric carcass rubberized with a carcass stock comprising a rubber selected from the group consisting of Hevea rubber, butadiene:styrene coplymer rubber containing 20 to 40% of styrene, mixtures of Hevea rubber and said butadiene:styrene copolymer rubber, and rubbery copolymer of an isoolefin having from 4 to 7 carbon atoms with 0.5 to 10% of a multi-olefinic unsaturate having from 4 to 14 carbon atoms, and a tread comprising carbon black and a rubbery copolymer of 70 to 85 parts of butadiene and correspondingly 30 to 15 parts of a meta-vinylpyridine and styrene taken together of which amount the meta-vinylpyridine comprises 10 to 30 parts, and an under-tread portion comprising a rubber selected from the group consisting of Hevea rubber, butadiene:styrene copolymer rubber, mixtures of Hevea rubber and said butadiene:styrene copolymer rubber, and rubbery copolymer of an isoolefin having from 4 to 7 carbon atoms with 0.5 to 10% of a multi-olefinic unsaturate having from 4 to 14 carbon atoms disposed between said tread and carcass and integrally united therewith, the said tread being so compounded as to have stress-strain characteristics similar to those of a butadiene-styrene copolymer rubber tread having reinforcing amounts of carbon black.

10. A pneumatic tire capable of delivering high road mileage and characterized by exceptionally high resistance to abrasive tread wear and by freedom from tread separation, comprising a rubberized fabric carcass comprising a rubber selected from the group consisting of Hevea rubber, butadiene:styrene copolymer rubber, mixtures of Hevea rubber and said butadiene:styrene copolymer rubber, and rubbery copolymer of an isoolefin having from 4 to 7 carbon atoms with 0.5 to 10% of a multi-olefinic unsaturate having from 4 to 14 carbon atoms, a tread comprising carbon black and a rubbery interpolymer of 15 to 30 parts of a meta-vinylpyridine and correspomndingly 85 to 70 parts of butadiene, and an under-tread portion comprising a rubber selected from the group consisting of Hevea rubber, butadiene:styrene copolymer rubber, mixtures of Hevea rubber and said butadiene:styrene copolymer rubber, and rubbery copolymer of an isoolefin having from 4 to 7 carbon atoms with 0.5 to 10% of a multi-olefinic unsaturate having from 4 to 14 carbon atoms disposed between said tread and carcass and integrally united therewith.

11. A pneumatic tire capable of delivering high road mileage and characterized by exceptionally high resistance to abrasive tread wear and by freedom from tread separation, comprising a rubberized fabric carcass comprising a rubber selected from the group consisting of Hevea rubber, butadiene:styrene copolymer rubber, mixtures of Hevea rubber and said butadiene:styrene copolymer rubber, and rubbery copolymer of an isoolefin having from 4 to 7 carbon atoms with 0.5 to 10% of a multi-olefinic unsaturate having from 4 to 14 carbon atoms, a tread comprising a reinforcing filler and a rubbery interpolymer of 15 to 30 parts of a meta-vinylpyridine and correspondingly 85 to 70 parts of butadiene, and an under-tread portion comprising a rubber selected from the group consisting of Hevea rubber, butadiene:styrene copolymer rubber, mixtures of Hevea rubber and said butadiene:styrene copolymer rubber, and rubbery copolymer of an isoolefin having from 4 to 7 carbon atoms with 0.5 to 10% of a multi-olefinic unsaturate having from 4 to 14 carbon atoms disposed between said tread and carcass and integrally united therewith.

12. A pneumatic tire capable of delivering high road mileage and characterized by exceptionally high resistance to abrasive tread wear and by freedom from tread separation, comprising a rubberized fabric carcass comprising a rubber selected from the group consisting of Hevea rubber, butadiene:styrene copolymer rubber, mixtures of Hevea rubber and said butadiene:styrene copolymer rubber, and rubbery copolymer of an isoolefin having from 4 to 7 carbon atoms with 0.5 to 10% of a multi-olefinic unsaturate having from 4 to 14 carbon atoms, a tread comprising a reinforcing filler and a rubbery interpolymer of 70 to 85 parts of butadiene and correspondingly 30 to 15 parts of a meta-vinylpyridine and styrene taken together of which amount the meta-vinylpyridine comprises 10 to 30 parts, and an under-tread portion comprising a rubber selected from the group consisting of Hevea rubber, butadiene:styrene copolymer rubber, mixtures of Hevea rubber and said butadiene:styrene copolymer rubber, and rubbery copolymer of an isoolefin having from 4 to 7 carbon atoms with 0.5 to 10% of a multi-olefinic unsaturate having from 4 to 14 carbon atoms disposed between said tread and carcass and integrally united therewith.

13. A pneumatic tire capable of delivering high road mileage and characterized by exceptionally high resistance to abrasive tread wear and by freedom from tread separation, comprising a rubberized fabric carcass comprising a rubber selected from the group consisting of Hevea rubber, butadiene:styrene copolymer rubber, mixtures of Hevea rubber and said butadiene:styrene copolymer rubber, and rubbery copolymer of an isoolefin having from 4 to 7 carbon atoms with 0.5 to 10% of a multi-olefinic unsaturate having from 4 to 14 carbon atoms and a tread comprising a reinforcing filler and a rubbery interpolymer of 70 to 85 parts of butadiene and correspondingly 30 to 15 parts of a meta-vinylpyridine and styrene taken together of which amount the meta-vinylpyridine comprises 10 to 30 parts, said rubberized fabric carcass and said tread being adhered together with a mutually compatible adhesive compound.

14. A pneumatic tire capable of delivering high road mileage and characterized by exceptionally high resistance to abrasive tread wear and by freedom from tread separation, comprising a rubberized fabric carcass comprising a rubber selected from the group consisting of Hevea rubber, butadiene:styrene copolymer rubber, mixtures of Hevea rubber and said butadiene:styrene copolymer rubber, and rubbery copolymer of an isoolefin having from 4 to 7 carbon atoms with 0.5 to 10% of a multi-olefinic unsaturate having from 4 to 14 carbon atoms, a tread comprising a reinforcing filler and a rubber interpolymer of 70 to 85 parts of butadiene and correspondingly 30 to 15 parts of a meta-vinylpyridine and styrene taken together of which amount the meta-vinylpyridine comprises at least 5 parts, and an under-tread portion comprising a rubber selected from the group consisting of Hevea rubber, butadiene:styrene copolymer rubber, mixtures of Hevea rubber and said butadiene:styrene copolymer rubber, and rubbery copolymer of an isoolefin having from 4 to 7 carbon atoms with 0.5 to 10% of a multi-olefinic unsaturate having from 4 to 14 carbon atoms disposed between said tread and carcass and integrally united therewith.

15. A pneumatic tire capable of delivering high road mileage and characterized by exceptionally high resistance to abrasive tread wear and by freedom from tread separation, comprising a rubberized fabric carcass comprising a rubber selected from the group consisting of Hevea rubber, butadiene:styrene copolymer rubber, mixtures of Hevea rubber and said butadiene:styrene copolymer rubber, and rubbery copolymer of an isoolefin having from 4 to 7 carbon atoms with 0.5 to 10% of a multi-olefinic unsaturate having from 4 to 14 carbon atoms and a tread comprising a reinforcing filler and a rubbery interpolymer of 70 to 85 parts of butadiene and correspondingly 30 to 15 parts of a meta-vinylpyridine and styrene taken together of which amount the meta-vinylpyridine comprises at least 5 parts based on the weight of total monomers.

16. A pneumatic tire capable of delivering high road mileage and characterized by exceptionally high resistance to abrasive tread wear and by freedom from tread separation, comprising a rubberized fabric carcass comprising a rubber selected from the group consisting of Hevea rubber, butadiene:styrene copolymer rubber, mixtures of Hevea rubber and said butadiene:styrene copolymer rubber, and rubbery copolymer of an isoolefin having from 4 to 7 carbon atoms with 0.5 to 10% of a multi-olefinic unsaturate having from 4 to 14 carbon atoms and a tread comprising a reinforcing filler and an oil extended rubbery interpolymer of 70 to 85 parts of butadiene monomer and correspondingly 30 to 15 parts of a meta-vinylpyridine monomer and styrene monomer taken together of which amount the meta-vinylpyridine comprises at least 5 parts based on the weight of total monomers.

17. A pneumatic tire capable of delivering high road mileage and characterized by exceptionally high resistance to abrasive tread wear and by freedom from tread separation, comprising a rubberized fabric carcass comprising a rubber selected from the group consisting of Hevea rubber, butadiene:styrene copolymer rubber, mixtures of Hevea rubber and said butadiene:styrene copolymer rubber, and rubbery copolymer of an isoolefin having from 4 to 7 carbon atoms with 0.5 to 10% of a multi-olefinic unsaturate having from 4 to 14 carbon atoms and a tread comprising a reinforcing filler and a rubber interpolymer of 15 to 30 parts of a meta-vinylpyridine and correspondingly 85 to 70 parts of butadiene.

18. A pneumatic tire capable of delivering high road mileage and characterized by exceptionally high resistance to abrasive tread wear and by freedom from tread separation, comprising a rubberized fabric carcass comprising a rubber selected from the group consisting of Hevea rubber, butadiene-styrene copolymer rubber, mixtures of Hevea rubber and said butadiene:styrene copolymer rubber, and rubbery copolymer of an isoolefin having from 4 to 7 carbon atoms with 0.5 to 10% of a multi-olefinic unsaturate having from 4 to 14 carbon atoms and a tread comprising a reinforcing filler and an oil extended rubbery interpolymer of 15 to 30 parts of a meta-vinylpyridine and correspondingly 85 to 70 parts of butadiene.

19. The pneumatic tire of claim 13 wherein the meta-vinylpyridine is 3-vinylpyridine.

20. The pneumatic tire of claim 13 where the meta-vinylpyridine is 2-methyl-5-vinylpyridine.

21. The pneumatic tire of claim 17 wherein the meta-vinylpyridine is 3-vinylpyridine.

22. The pneumatic tire of claim 17 wherein the meta-vinylpyridine is 2-methyl-5-vinylpyridine.

23. The pneumatic tire of claim 13 wherein the rubbery interpolymer is vulcanized in the presence of a delayed action accelerator.

24. The pneumatic tire of claim 17 wherein the rubbery interpolymer is vulcanized in the presence of a delayed action accelerator.

25. The pneumatic tire of claim 10 wherein the tread and under-tread portions of said tire are vulcanized in the presence of a delayed action accelerator.

References Cited in the file of this patent

UNITED STATES PATENTS

| | | |
|---|---|---|
| 1,913,330 | Brickman | June 6, 1933 |
| 2,009,643 | Woock | July 30, 1935 |
| 2,467,322 | Lightbown et al. | Apr. 12, 1949 |
| 2,640,042 | Howland et al. | May 26, 1953 |
| 2,713,884 | Schwartz | July 26, 1955 |
| 2,773,795 | Reynolds | Dec. 11, 1956 |
| 2,817,616 | Wolfe | Dec. 24, 1957 |

OTHER REFERENCES

Industrial and Engineering Chemistry, volume 40, No. 5, May 1948, pages 879–882.